March 17, 1970 HUGH L. DRYDEN 3,501,743
DEPUTY ADMINISTRATOR OF THE NATIONAL
AERONAUTICS AND SPACE ADMINISTRATION
AUTOMATIC FAULT CORRECTION SYSTEM FOR PARALLEL SIGNAL CHANNELS
Filed Nov. 4, 1965 4 Sheets-Sheet 1

INVENTOR.
JACOB GOLDBERG
BY
[signature]
[signature]
ATTORNEYS

| x | y | z |
|---|---|---|
| 0 | 0 | 0 |
| 1 | 0 | 1 |
| 0 | 1 | 1 |
| 1 | 1 | 0 |

| | a | b | c | d | e | f | g | h | i | j | INPUTS OF 55R | | | 55S | | | 55T | | | 55U | | | 55V | | | $R_{out}$ | $S_{out}$ | $T_{out}$ | $U_{out}$ | $V_{out}$ |
|---|---|---|---|---|---|---|---|---|---|---|---|---|---|---|---|---|---|---|---|---|---|---|---|---|---|---|---|---|---|---|
| ROW 1 | 1 | 1 | 1 | 0 | 1 | 1 | 0 | 0 | 0 | 0 | 1 | 1 | 1 | 1 | 1 | 1 | 1 | 1 | 1 | 0 | 0 | 0 | 0 | 0 | 0 | 1 | 1 | 1 | 0 | 0 |
| ROW 2 | 0 | 0 | 1 | 0 | 1 | 1 | 0 | 0 | 0 | 0 | 0 | 1 | 1 | 1 | 0 | 1 | 1 | 0 | 1 | 0 | 1 | 0 | 0 | 1 | 0 | 1 | 1 | 1 | 0 | 0 |
| ROW 3 | 1 | 1 | 1 | 0 | 0 | 0 | 0 | 0 | 0 | 0 | 1 | 1 | 0 | 1 | 1 | 0 | 0 | 1 | 1 | 0 | 1 | 0 | 0 | 1 | 0 | 1 | 1 | 1 | 0 | 0 |

INVENTOR.
JACOB GOLDBERG
BY
J. Tom McCoy
J. H. Warden
ATTORNEYS

March 17, 1970 HUGH L. DRYDEN 3,501,743

DEPUTY ADMINISTRATOR OF THE NATIONAL
AERONAUTICS AND SPACE ADMINISTRATION

AUTOMATIC FAULT CORRECTION SYSTEM FOR PARALLEL SIGNAL CHANNELS

Filed Nov. 4, 1965 4 Sheets-Sheet 3

INVENTOR.
JACOB GOLDBERG

BY [signature] [signature]
ATTORNEYS

March 17, 1970 HUGH L. DRYDEN 3,501,743
DEPUTY ADMINISTRATOR OF THE NATIONAL
AERONAUTICS AND SPACE ADMINISTRATION
AUTOMATIC FAULT CORRECTION SYSTEM FOR PARALLEL SIGNAL CHANNELS
Filed Nov. 4, 1965 4 Sheets-Sheet 4

INVENTOR.
JACOB GOLDBERG
BY
ATTORNEYS

United States Patent Office 3,501,743
Patented Mar. 17, 1970

3,501,743

AUTOMATIC FAULT CORRECTION SYSTEM FOR PARALLEL SIGNAL CHANNELS

Hugh L. Dryden, Deputy Administrator of the National Aeronautics and Space Administration, with respect to an invention of Jacob Goldberg, Palo Alto, Calif.

Filed Nov. 4, 1965, Ser. No. 506,908
Int. Cl. G06f *11/00;* G08b *29/00*
U.S. Cl. 340—146.1 11 Claims

ABSTRACT OF THE DISCLOSURE

A plurality of signal channels, each with a failure-susceptible element, interconnected to correct for the failure of any one of said elements. The input signals of two different channels are transmitted through each failure-susceptible element during two different cycles of operation. The transmitted signals, temporarily stored in storage units, are supplied to majority circuits. Each majority circuit, associated with a different channel, provides a signal corresponding to its channel's input signal as long as not more than one failure-susceptible element fails.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to binary circuitry and more particularly to a system for automatic correction of signal errors in binary signal circuitry.

Many proposals have been made and systems devised to cope with the problem of errors occurring in binary signal channels and other binary logic circuitry which are extensively used in data processing systems. Although logical elements, such as different type gates, are subject to failure, they are generally much more reliable than elements such as amplifiers which are used in the various signal channels. Hereafter, the elements which are less reliable and subject to more frequent failure will be referred to as the signal channel elements or failure-susceptible elements as distinguished from the logical elements which are much more reliable and which are assumed for the present invention to be failproof.

To prevent the possible failure of a signal channel element to result in erroneous output signals, various redundant logic circuits have been proposed. Basically in all such circuits, redundant signal channels are employed. Any significant signal propagates in a plurality of similar channels which are so interconnected that even if a signal channel element fails in any of the redundant channels, the final output signal is nevertheless unaffected. Thus the redundant channel circuits automatically correct for a failure of any of the signal channel elements.

Though various presently known redundant logic circuits accomplish the desired results, due to their basic mode of operation, namely redundancy, they require a large number of components and elements which greatly increase the size and cost of the systems in which they are incorporated. Furthermore, the increased number of components and elements increases the problems of maintaining the systems in failure-free operating conditions.

Accordingly, it is an object of the present invention to provide a novel system for automatically correcting signal errors produced in signal channels by malfunctioning signal channel elements.

Another object is to provide a new signal error correcting system which requires fewer redundant channels than prior art arrangements.

A further object is the provision of a relatively simple system for providing error-free output signals despite a failure of any signal channel element therein.

These and other objects are achieved by providing a system in which a plurality of interconnected signal channels, each one of which includes a failure-susceptible signal channel element, include a minimum number of signal storage elements and majority circuits. Each majority circuit which is associated with a different signal channel is supplied with signals from different groups of the signal storage elements selected in such a manner that even when one of the signal channel elements fails, providing an erroneous signal, the output of the majority circuit corresponds to the input signal of its respective channel. Thus the effect of the failure of the signal channel element is nullified, the system providing automatic correction to prevent an erroneous output signal.

In one embodiment of the invention, automatic correction is provided in a two independent signal channel arrangement by incorporating one additional dependent channel, the input of which is a function of the inputs to the other two channels. With a pair of signal storage elements and a single signal channel element associated with each channel, the two majority circuits associated with the two independent channels are supplied with signals so that irrespective of the failure of any one of the three signal channel elements, the output of each majority circuit corresponds to the input of its respective channel.

In another embodiment of the invention wherein five independent signal channels are interconnected, the additional channel is eliminated. Yet the majority circuit of each channel provides an output corresponding to the input to its respective channel as long as only one of the five signal channel elements fails at any given time.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
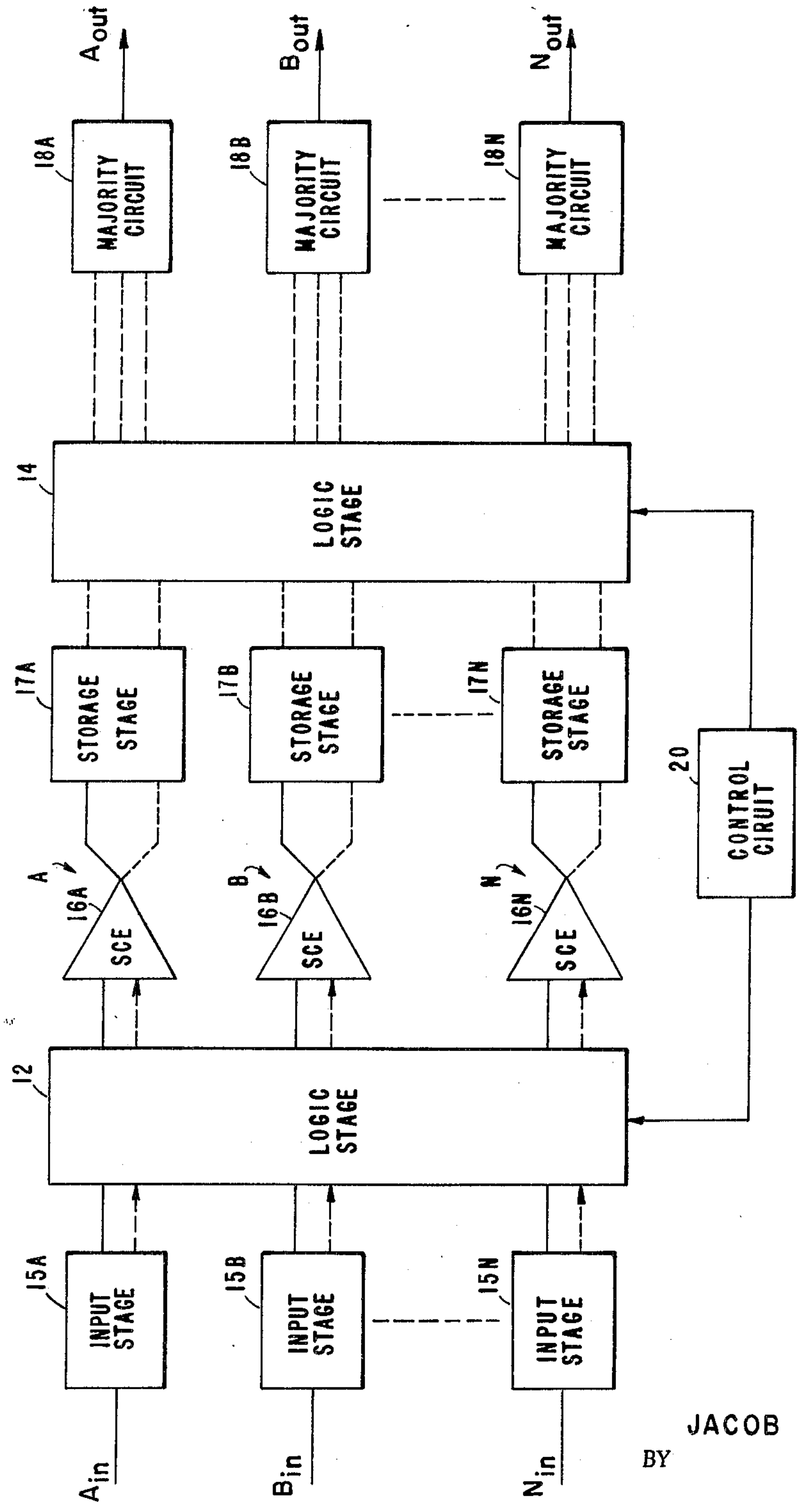
FIGURE 1 is a block diagram useful in explaining the principles of operations of the present invention.

Attention is first directed to FIGURE 1 which is a simplified block diagram useful in explaining the principles of operation of the present invention. In accordance with the teachings of the invention, a plurality of signal channels A, B, and N are interconnected by means of logic stages 12 and 14. Each channel includes as input stage 15, a failure-susceptible signal channel element (SCE) 16, a storage stage 17, and a majority circuit 18. Letters A, B, and N are used as subscripts to designate the respective elements associated with each channel.

The system diagrammed in FIG. 1 is controlled by a control circuit 20 to operate in a dual cycle mode. During the first cycle, the signals, such as a binary "1" or a binary "0," supplied from a signal source (not shown) to the input stages 15A, 15B . . . 15N are supplied, through the logic stage 12 to their respective signal channel elements and therefrom to the storage stages 17A, 17B . . . 17N. Then, during the second cycle of operation, the output of each input stage is supplied to one of the signal channel elements, other than the element in its respective channel. The signal is supplied either directly or after being combined with the output of another of the input stages. The outputs of the signal channel elements during this second cycle are also stored in their respective storage stages. In FIGURE 1, solid lines represent the propagation paths of signals during the first cycle and the dashed lines represent the signals propagation paths during the second cycle of operation. In the rest of the figures, dashed lines are used to designate the propagation paths of signals during the second cycle only between the input stages and the storage stages or units.

At the end of the second cycle, the signals stored in the storage stages 17A, 17B . . . 17N are supplied to the logic stage 14 wherein the signals are combined so that a plurality of inputs are supplied to each majority circuit. The inputs to each circuit are a function of the signal supplied to the corresponding input stage of the same channel. For example, if a "1" is supplied to input stage 15A, after the second cycle of operation, the three inputs to circuit 18A are all "1's" if all signal channel elements 16A, 16B and 16N function properly. If one of the elements fails, only two of the inputs to the majority circuit 18A represent a "1." However, since each of two out of the three inputs is a "1," the output of the majority circuit $A_{out}$ representing the output of channel A is a "1" which corresponds to the input to the same channel.

Figures 2, 3, 6:
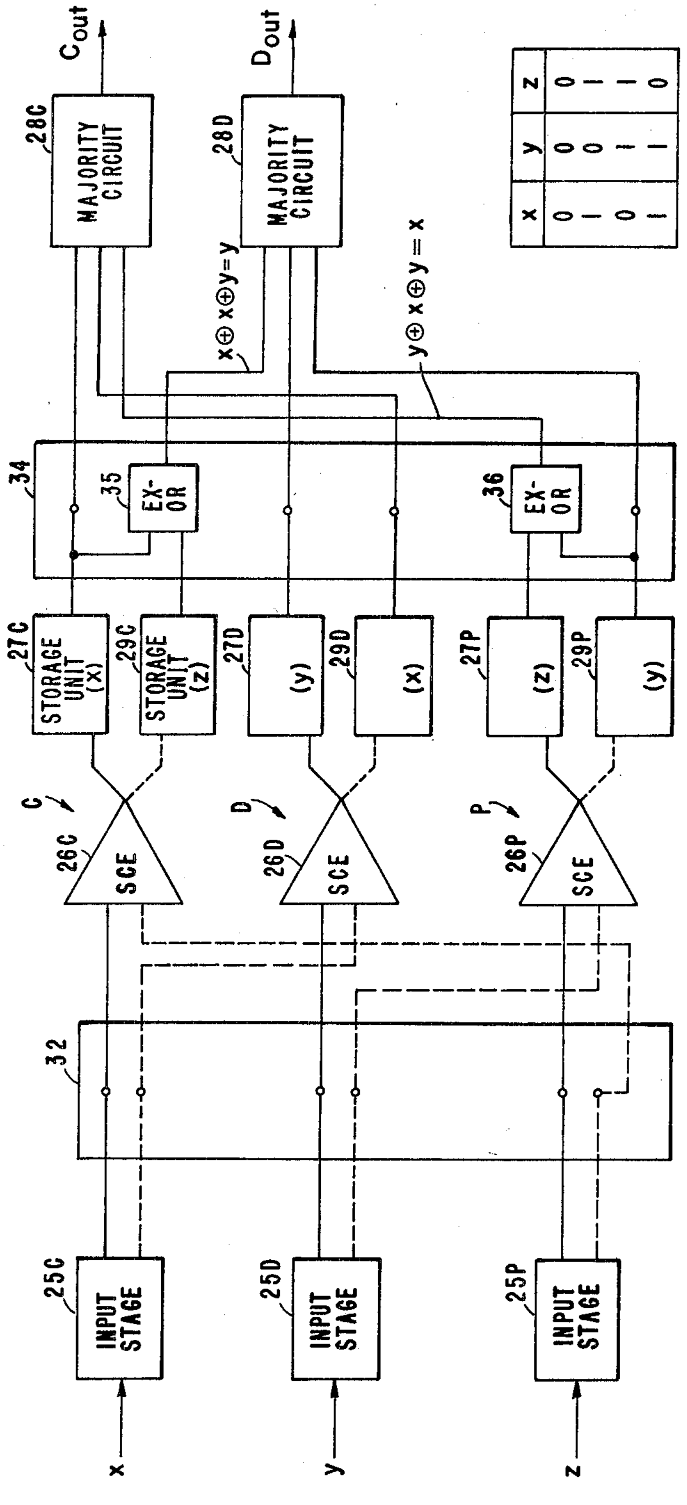
FIGURE 2 is a block diagram of one embodiment of the present invention.
FIGURE 3 is a table, known as the truth table, of the Exclusive-Or function.
FIGURE 6 is a chart useful in explaining the operation of the embodiment shown in FIGURE 4.

Reference is now made to FIGURE 2 which is a block diagram of one embodiment of the invention in which automatic correction is provided for two independent channels C and D. Each channel comprises an input stage 25, a signal channel element 26, two storage units 27 and 29 which together may be thought of as comprising a storage stage such as stage 17A of FIGURE 1. Also a majority circuit 28 is associated with each independent channel. Subscripts C and D are used to denote the various elements in their respective channels.

The system also includes a dependent channel P, including an input stage 25P, a signal channel element 26P and storage units 27P and 29P. The input signals $x$ and $y$, supplied to channels C and D respectively, are independent of one another. However, the input to channel P is related to inputs $x$ and $y$, supplied to channels C and D, by the Exclusive-Or function, expressed as $z=x\oplus y$. Namely, $z$ is a "1" when $x$ and $y$ differ from one another and $z$ is a "0" when $x$ and $y$ are the same. FIGURE 3, to which reference is made herein, represents a truth table for the Exclusive-Or function. The symbol $\oplus$ will hereafter be used to represent the Exclusive-Or function.

The system also includes a logic stage 32 which, as seen from FIGURE 3, operates as a multi-channel gate. Its function is to supply the $x$, $y$ and $z$ inputs directly to signal channel elements 26C, 26D and 26P respectively during the first cycle of operation. These signals are then stored in storage units 27C, 27D and 27P. Then during the second cycle of operation, the $x$, $y$ and $z$ signals from stages 25C, 25D and 25P respectively are supplied through logic stage 32 to elements 26D, 26P and 26C respectively. Therefrom they are stored in units 29D, 29P and 29C respectively. Thus, if all three signal channel elements 26C, 26D and 26P operate properly, an $x$ signal is stored in units 27D and 29P and units 27P and 29C store a $z$ signal. These signal letters ($x$, $y$ and $z$) are shown in parentheses in the various storage units diagrammed in FIGURE 2.

Storage units 27C and 29D are connected through a logic stage 34 to majority circuit 28C, while units 27D and 29P are directly connected to majority unit 28D. Units 27C and 29C are also connected to an Exclusive-Or gate 35, the output of which is connected to circuit 28D. Similarly, units 27P and 29P are connected to an Exclusive-Or gate 36 which is connected to the majority circuit 28C.

From the foregoing, it should be appreciated that the output of majority circuit 28C is a function of the signals stored in units 27C, 29D and the output of gate 36 which is a function of the signals stored in units 27P and 29P. When all three signal channel elements 26C, 26D and 26P operate properly, each of units 27C and 29P stores an $x$ signal, and units 27P and 29P store a $z$ signal and a $y$ signal respectively. Thus, the output of gate 36 is actually an $x$ signal since $z=x\oplus y$ and therefore $$y\oplus x=y\oplus x\oplus y=x$$

Thus, all three inputs to majority circuit 28C represent $x$ signals so that the output of the circuit 28C which represents the output of channel C is an $x$ signal, the same as its input signal.

If however one of the signal channel elements is not functioning properly, one of the three inputs to circuit 28C will no longer be an $x$ signal. Yet since two out of the three inputs will be $x$ signals the output of circuit 28C will remain unaltered, i.e. will represent an $x$ signal. For example, if signal channel element 26C in channel C malfunctions, unit 27C may no longer store an $x$ signal. However, $x$ signals will be supplied to majority circuit 28C from unit 29D and Exclusive-Or gate 36. Thus the output of circuit 28C will be an $x$ signal even though the signal channel element (26C) in its channel does not function properly.

Similarly, the inputs to majority circuit 28D are dependent on the input to input stage 25D of channel D and the proper functioning of the signal channel elements. When the three circuits function properly, units 27D, 29P store $y$ signals, which is the input to unit 25D. Also, the output of Exclusive-Or gate 35 is $x\oplus x\oplus y=y$. Thus, all three inputs to circuit 28D are y signals so that the output is also a $y$ signal. Even if one of the signal channel elements fails, such as signal channel element 26D, two of the inputs to circuit 28D are nevertheless of signals so that the output of circuit 28D remains a $y$ signal despite the failure of one of the signal channel elements.

From the foregoing, it is thus seen that as long as only one of the three signal channel elements fails at least two out of three input signals to each majority circuit corresponds to the input signal supplied to the input stage of its corresponding channel. Thus the majority circuit produces an output signal which corresponds to the input signal of its particular channel, which represents the proper operation of the channel.

Figure 4:
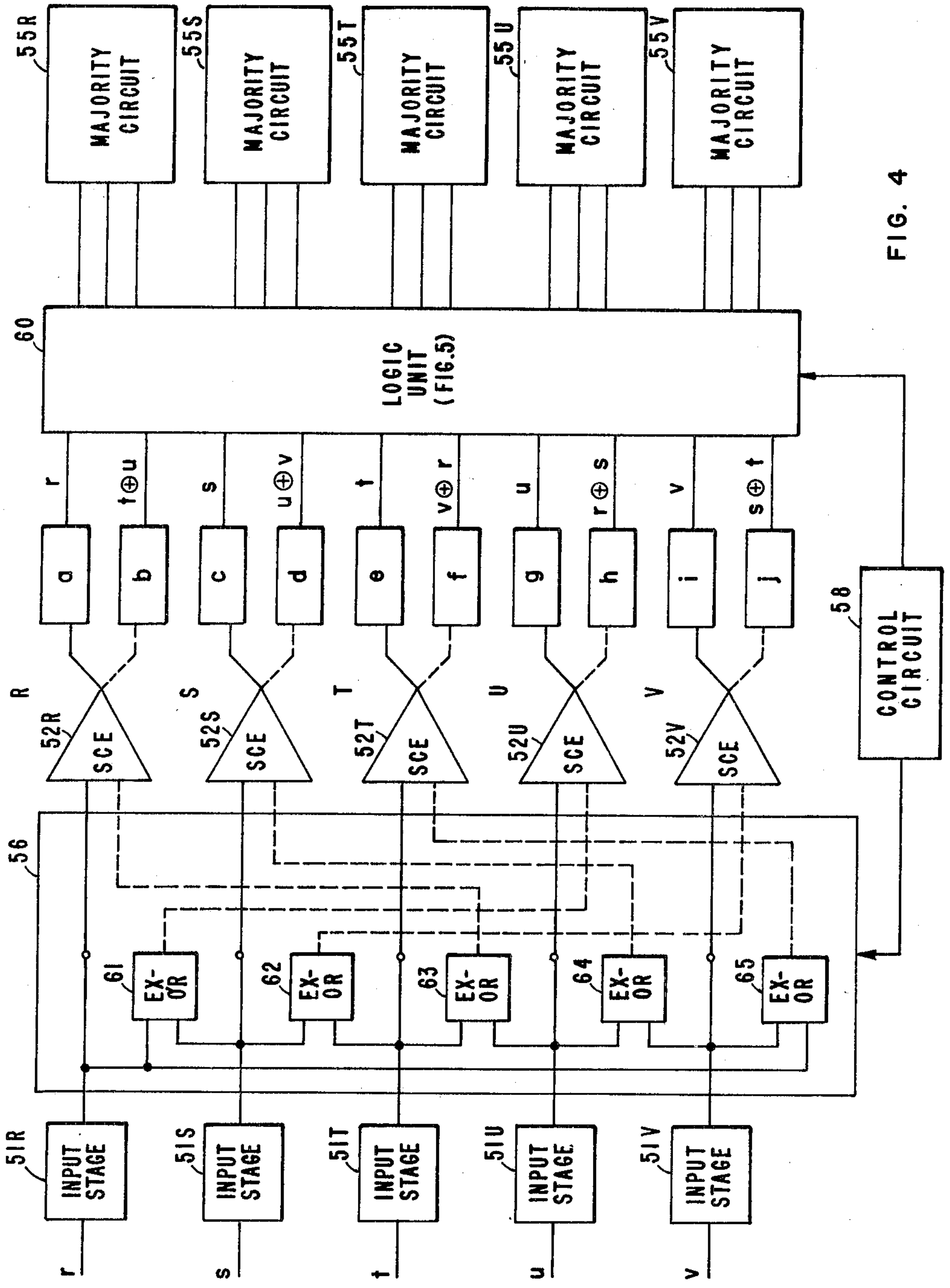
FIGURE 4 is a block diagram of another embodiment of the invention.

In another embodiment of the invention, the need for an extra channel such as channel P is eliminated when at least five independent channels are combined to provide automatic correction for a faulty signal channel element. Referring to FIGURE 4, there are shown five interconnected channels desingated R through V. Each channel includes an input stage 51, a failure-susceptible signal channel elements 52, and a majority circuit 55, the output of which represents the channel's output. Subscripts R through V are used to designate the various elements associated with each channel. Let it be assumed that input stages 51R through 51V are supplied with binary input signals $r$ through $v$ respectively, each input signal either a "1" or a "0."

As seen from FIGURE 4, the input stages 10 are connected to the various signal channel elements through a logic stage 56 which includes five Exclusive-Or gates 61 through 65. Each gate is supplied with two inputs from another pair of input stages to perform the Exclusive-Or function, the truth table of which is shown in FIGURE 3. Gates 61 through 65 are supplied with inputs from stages 51R and 51S, 51S and 51T and 51U, 51U and 51V, and 51V and 51R respectively. The outputs of gates 61 through 65 are connected to the input of the signal channel elements 52U, 52V, 52R, 52S and 52T respectively.

The logic stage 56 is controlled by a control circuit 58 so that during a first cycle of operation, the signals $r$ through $v$ from units 51R through 51V respectively are directly supplied to signal channel elements 52R through 52V. If all the latter mentioned elements function properly, signals *r* through *v* are stored in storage units *a, c, e, g* and *i* respectively. During the second cycle of operation, the outputs of the five gates 61 through 65 are supplied to the five signal channel elements and stored in storage unit *b, d, f, h* and *j*. The output signal of gates 61 through 65 may be expressed as $r\oplus s$, $s\oplus t$, $t\oplus u$, $u\oplus v$, and $v\oplus r$ respectively. Thus when elements 52U, 52V, 52R, 52S and 52T function properly, these signals are stored in units *h, j, b, d,* and *f* respectively. The signals stored in storage units *a* through *j* are shown in FIGURE 4 above the output lines of the storage units which are connected to a logic stage 60. The function of stage 60 is to combine the various signals supplied thereto so that if all five signal channel elements 52R through 52V function properly, the three inputs to each majority circuit correspond to the input signal supplied to its respective channel. Namely, the three inputs to circuit 55R are *r* signals and so on. On the other hand, if one of the signal channel elements malfunctions, one of the input signals to one of the majority circuits may differ from the signal supplied to its respective channel. However, since the other two, namely a majority of the input signals do correspond to the channel's input signal, the output signal of the majority circuit will nevertheless correspond thereto.

Figure 5:
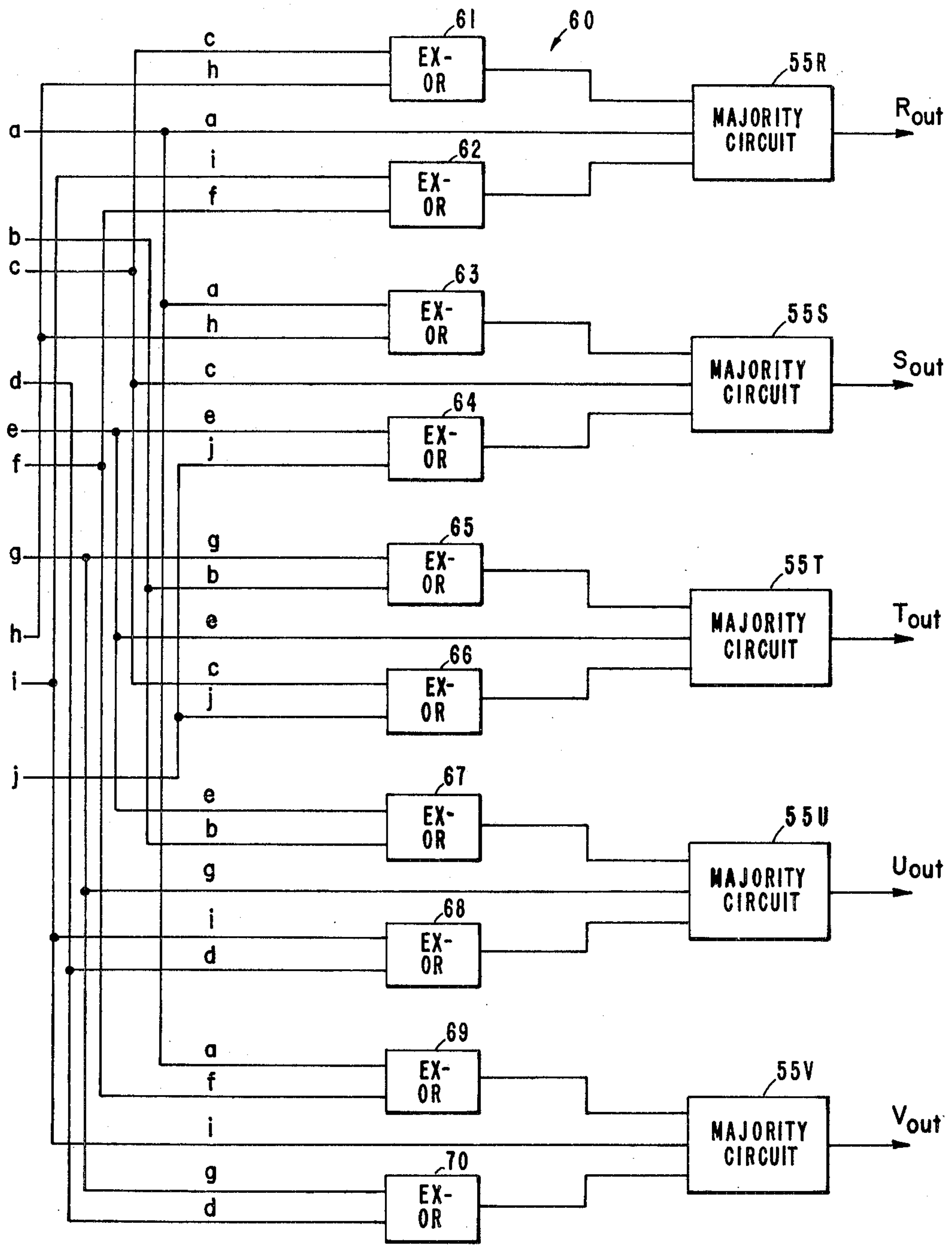
FIGURE 5 is an expanded block diagram of a portion of the arrangement shown in FIGURE 4.

Referring to FIGURE 5 wherein a block diagram of the logic stage 60 is shown comprising ten Exclusive-Or gates 61 through 70. The output of storage unit *a* is connected through logic stage 60 to majority circuit 55R as well as to one input of each of gates 63 and 69. The output of storage unit *b* is connected to one input of each of gates 65 and 67, while the output of storage unit *c* is directly connected to the majority circuit 55S and to one input of each of gates 61 and 66.

The output of storage unit *d* is connected to one input of each of gates 68 and 70 while the output of unit *e* is connected to one input of each of gates 64 and 67 and to majority circuit 55T. One input of each of gates 62 and 69 is connected to the output of storage unit *f*. In a similar manner, the outputs of storage units *g* and *h* are connected to circuit 55U, gate 65 and 70 and to gates 61 and 63 respectively, while the output of gate *i* is connected to majority circuit 55V and to gates 62 and 68, and the output of unit *j* is connected to one input of each of gates 64 and 66. The output of the pairs of gates 61 and 62, 63 and 64, 65 and 66, 67 and 68, and 69 and 70 are connected to the inputs of majority circuits 55R through 55V respectively, whose output signals are desingated as $R_{out}$ and $V_{out}$ respectively.

From the foregoing, it should be appreciated that the output signals may be represented by the following functional relationships:

$$R_{out}=\text{Majority of } (a,\ c\oplus h,\ i\oplus f) \quad (1)$$
$$S_{out}=\text{Majority of } (c,\ a\oplus h,\ e\oplus j) \quad (2)$$
$$T_{out}=\text{Majority of } (e,\ g\oplus b,\ c\oplus j) \quad (3)$$
$$U_{out}=\text{Majority of } (g,\ e\oplus b,\ i\oplus d) \quad (4)$$
$$V_{out}=\text{Majority of } (i,\ a\oplus f,\ g\oplus d) \quad (5)$$

where *a* through *j* represent the signals stored in units *a* through *j*.

When all five signal channel elements operate properly, the signals stored in units *a* through *j* are as diagrammed in FIGURE 4 so that the functional relationships may be expressed as:

$$R_{out}=\text{Majority of } (r,\ s\oplus r\oplus s,\ v\oplus v\oplus r)$$
$$=\text{Majority of } (r, r, r)=r \quad (6)$$
$$S_{out}=\text{Majority of } (s,\ r\oplus s\oplus r,\ t\oplus s\oplus t)$$
$$=\text{Majority of } (s, s, s)=s \quad (7)$$
$$T_{out}=\text{Majority of } (t,\ u\oplus t\oplus u,\ s\oplus s\oplus t)$$
$$=\text{Majority of } (t, t, t)=t \quad (8)$$
$$U_{out}=\text{Majority of } (u,\ t\oplus t\oplus u,\ v\oplus u\oplus v)$$
$$=\text{Majority of } (u, u, u)=u \quad (9)$$
$$V_{out}=\text{Majority of } (v,\ r\oplus v\oplus r,\ u\oplus u\oplus v)$$
$$=\text{Majority of } (v, v, v)=v \quad (10)$$

Thus, the output signal of each majority circuit corresponds to the input signal supplied to its respective channel.

Assuming that one of the signal channel elements, such as element 52T, fails, then the signals stored in units *e* and *f* may be ambiguous. Representing such signals with a question mark (?), the functional relationships may be defined as:

$$R_{out}=\text{Majority of } (r,\ s\oplus r\oplus s,\ v\oplus ?)$$
$$=\text{Majority of } (r, r, ?)=r \quad (11)$$
$$S_{out}=\text{Majority of } (s,\ r\oplus s\oplus r,\ ?\oplus s\oplus t)$$
$$=\text{Majority of } (s, s, ?)=s \quad (12)$$
$$T_{out}=\text{Majority of } (?,\ u\oplus t\oplus u,\ s\oplus s\oplus t)$$
$$=\text{Majority of } (?, t, t)=t \quad (13)$$
$$U_{out}=\text{Majority of } (u,\ ?\oplus t\oplus u,\ v\oplus u\oplus v)$$
$$=\text{Majority of } (u, ?, u)=u \quad (14)$$
$$V_{out}=\text{Majority of } (v,\ ?\oplus r,\ u\oplus u\oplus v)$$
$$=\text{Majority of } (v, ?, v)=v \quad (15)$$

From the above relationships, it is seen that each of the majority circuits is supplied with one ambiguous input signal. However, since a majority, namely two out of the three signals corresponds to the input to its respective channel, its output will correspond thereto. Thus $R_{out}$ through $V_{out}$ will be signals *r* through *v* which equal the input signals *r* through *v* supplied to channels R through V respectively.

The teachings herein disclosed may further be exemplified in conjunction with FIGURE 6. Let us assume that *r, s,* and *t*, are binary "1's" and *u* and *v* are binary "0's." Then storage units *a* through *j* will store binary signals as shown in row 1 of FIGURE 6. The input signals to circuits 55R through 55V and output signals $R_{out}$ through $V_{out}$ are also shown in row 1. If however signal channel element 52R fails, the signals in units *a* and *b* are no longer binary "1's" but rather binary "0's" as shown in row 2. Therefore, only two input signals to each majority circuit correspond to the channel's input signal. However, the output signals $R_{out}$ through $V_{out}$ remain unaltered. Row 3 represents the signals stored and produced when signal channel element 52T fails.

From the foregoing description, it should therefore be appreciated that in accordance with the teachings of the present invention, a plurality of signal channels may be interconnected to provide automatic fault correction to prevent the failure of any one signal channel element from resulting in error signals. As herebefore described, logic stages comprising of pluralities of Exclusive-Or gates are used, together with majority circuits, one such circuit being included in each independent signal channel. Each majority circuit is supplied with three input signals. When all failure-susceptible signal channel elements operate properly, the three input signals to each majority circuit are the same as the input signal to the particular channel, so that the majority circuit's output signal is the same. But when one of the signal channel elements fails, only two input signals are the same as the channel's input signal. However, since two out of three represents a majority, the majority circuit's output signal representing the channel's output signal is the same as the input signal to the channel.

It is appreciated by those familiar with the art that modifications may be made in the arrangements as shown without departing from the true spirit of the invention. Therefore, all modifications and equivalents are deemed to fall within the scope of the invention as claimed in the appended claims.

What is claimed is:

1. A system for automatically correcting for signal errors produced in a plurality of signal channels by the failure of one failure-susceptible element in one of said channels, the system comprising:

a plurality of signal channels each channel including input means for receiving an input signal, a failure-susceptible element and a pair of signal-storing elements coupled to the output of the failure-susceptible element;

a first logic stage for transferring input signals received by said plurality of input means to said plurality of failure-susceptible elements for storing said signals in said plurality of signal-storing elements;

a plurality of majority circuits; and a second logic stage interposed between said plurality of signal-storing elements and said majority circuits for supplying each majority circuit associated with a different one of said channels with input signals which are a function of the input signal to its respective channel and the functioning of said failure-susceptible elements, whereby all the input signals supplied to each majority circuit correspond to the input signal supplied to its respective channel when all failure-susceptible elements function properly and only a majority of the input signals supplied to each majority circuit correspond to the input signal supplied to its respective channel when one of said failure-susceptible elements malfunctions.

2. In a multi-signal channel system wherein an input signal received in each channel propagates through a failure-susceptible element, a system for automatically correcting for the malfunctioning of one of said elements to provide an output signal from each channel which corresponds to the input signal received by the channel the system comprising:

first logic means coupled to the inputs of said failure-susceptible elements for supplying the input signals to said elements to provide a first plurality of signals;

means for storing said first plurality of signals;

a plurality of majority circuits, each circuit providing an output signal as a function of a majority of the signals supplied thereto; and second logic means coupling said means for storing to said plurality of majority circuits to supply a predetermined combination of signals out of said first plurality of signals stored in said means for storing to each majority circuit, whereby all the signals supplied to each majority circuit correspond to the input signal of the signal channel with which the majority circuit is associated when all of said failure-susceptible elements function properly and a majority of the signals supplied to each majority circuit correspond to the input signal of the respective channel when only one of said failure-susceptible elements malfunctions.

3. A system for automatically correcting for signal errors producible by the malfunctioning of one failure-susceptible element in one of two independent signal channels, the system comprising:

a pair of independent channels, each channel including means for receiving an independent input signal, a failure-susceptible element for providing an output signal which is in a preselected functional relationship with the input signal supplied thereto, when said element functions properly, a pair of storage elements, each for storing therein the output signal provided by said failure-susceptible element, a majority circuit for providing an output signal which is the same as the signal supplied to a majority of the input terminals thereof;

a dependent channel including means for receiving a dependent input signal which is a function of the input signals supplied to said pair of independent channels, a failure-susceptible element and a pair of storage elements coupled to the output of the failure-susceptible element;

first means for successively supplying to each failure-susceptible element the input signal received by its respective channel and the input signal received by the other of the two channels, means for successively supplying the output signal of each failure-susceptible element to the two storage elements coupled thereto; and second means interposed between said storage elements and said majority circuits for supplying to each majority circuit signals stored in selected ones of said storage elements, and at least one signal which is a function of signals stored in two storage elements, whereby all three input signals supplied to each majority circuit correspond to the input signal received by the channel with which the majority circuit is associated when all three failure-susceptible elements operate properly and only two of the three input signals supplied to the majority circuit correspond to the channel's input signals when only one of the three failure-susceptible elements malfunctions.

4. The system defined in claim 3 wherein the independent input signals to said independent channels are $x$ and $y$ respectively each being either a binary "zero" or a binary "one," and the dependent input signal is $z=x\oplus y$, where $\oplus$ represents the Exclusive-Or function.

5. The system defined in claim 4 wherein during a first cycle of operation said failure-susceptible elements are supplied with the input signals $x$, $y$ and $z$ received by their respective channels and during a second cycle of operation each failure-susceptible element is supplied with an input signal from one of the other two channels, whereby the signals received by said failure-susceptible elements are stored in said six storage elements when all three failure-susceptible elements function properly, each input signal being stored in a different pair of storage elements.

6. The system defined in claim 5 wherein said second means includes first and second Exclusive-Or gates said first gate being coupled to two storage elements wherein signals $x$ and $x\oplus y$ are stored to provide an output signal $x\oplus x\oplus y$ supplied as one input to the majority circuit associated with the independent channel receiving said $y$ input signal, said latter mentioned majority circuit being further provided with signals from the two storage elements wherein said $y$ input signals are stored and said second gate being coupled to two other storage elements wherein signals $y$ and $x\oplus y$ are stored to provide an output signal $y\oplus x\oplus y$ supplied as one input to the majority circuit associated with the channel supplied with said $x$ input signal, and means for providing said latter mentioned majority circuit with the $x$ signal stored in two of said storage elements.

7. The method of automatically correcting for signal errors produced in a plurality of signal channels due to the failure of one failure-susceptible element in one of said channels, to correctly transmit input signals therethrough, each input signal being associated with a different one of said channels, the steps comprising:

transmitting the input signal of each channel through its respective failure-susceptible element;

storing the input signals transmitted through the plurality of failure-susceptible elements in a first plurality of storage elements;

transmitting the input signal which is supplied through the failure-susceptible element of a channel other than the channel with which the input signal is associated;

storing the signals transmitted through said failure-susceptible elements in a second plurality of storage elements; and utilizing signals stored in different ones of the storage elements in said first and second pluralities of storage elements to provide for each channel an output signal which corresponds to the input signal of the respective channel when not more than one of said failure-susceptible elements malfunctions.

8. A method of automatically correcting for signal errors producible by the malfunctioning of one failure-susceptible element in one of five independent channels, the steps comprising:

transmitting the input signals of said five channels through their respective failure-susceptible elements during a first cycle;

storing the signals transmitted during said first cycle in a first plurality of storage elements;

combining pairs of input signals of different channels to produce five signals each being a function of a different pair of input signals;

during a second cycle, transmitting through each failure-susceptible element one of said signals which is a function of the input signals of two channels other than its respective channel;

storing the signals transmitted during said second cycle in a second plurality of storage elements;

producing signals each of which is a predetermined function of two signals stored in two storage elements in said first and second pluralities of storage elements; and utilizing the last produced signals and the signals stored in said first plurality of storage elements to form five groups, each group including three signals and being associated with a different one of said five channels, at least a majority of the three signals in each group corresponding to the input signal of the channel with which the group is associated when at least four of said five failure-susceptible elements function properly.

9. The method defined in claim 8 wherein in said step of combining the input signals of two adjacent channels are combined to produce a signal which represents the Exclusive-Or function of the two signals.

10. The method defined in claim 9 wherein each group of three signals at least two of the signals corresponds to one of the input signals when not more than one of said failure-susceptible elements malfunctions.

11. In a multichannel system wherein an input signal received by each channel propagates through a failure-susceptible element, the method of automatically correcting for the malfunctioning of not more than one failure-susceptible element, the steps comprising:

propagating through each failure-susceptible element the input signal supplied to its corresponding channel during a first cycle and a signal which is a function of at least the input signal of one other channel during a second cycle;

storing the propagated signals in storage elements; and utilizing the stored signals in groups to provide a group signal representing the signals of a majority of the signals in each group comprising of three signals, at least two of three signals in each group corresponding to a different one of the input signals when not more than one of said failure-susceptible elements malfunctions.

References Cited

UNITED STATES PATENTS

| | | | |
|---|---|---|---|
| 3,116,477 | 12/1963 | Bradbury | 307—219 X |
| 3,335,403 | 8/1967 | Mann et al. | 307—204 X |

MALCOLM A. MORRISON, Primary Examiner

R. STEPHEN DILDINE, Jr., Assistant Examiner